United States Patent [19]

Kraushaar et al.

[11] 4,200,771
[45] Apr. 29, 1980

[54] TRAFFIC MEASURING DEVICE BASED ON STATE TRANSITIONS

[76] Inventors: Jonathan M. Kraushaar, 7610 Allman Dr., #302, Annandale, Va. 22003; Ramses R. Mina, 301 N. Beauregard St., #604, Alexandria, Va. 22312

[21] Appl. No.: 949,135

[22] Filed: Oct. 6, 1978

[51] Int. Cl.² .............................................. H04M 3/36
[52] U.S. Cl. .................................. 179/8 A; 179/7.1 R
[58] Field of Search ................... 179/8 R, 8 A, 8.5, 9, 179/10, 7 R, 7 MM, 7.1 R, 7.1 TP, 172.5 R, 172.5 A; 235/92 R, 92 T, 92 TE

[56] References Cited

U.S. PATENT DOCUMENTS

| | | | |
|---|---|---|---|
| 3,324,241 | 6/1967 | Bachelet | 179/8 A |
| 3,562,436 | 2/1971 | Lutgenau | 179/7.1 R |
| 3,601,535 | 8/1971 | Heick | 179/175.2 A |
| 3,691,303 | 9/1972 | Davies | 179/8 A |
| 3,868,480 | 2/1975 | Murgio et al. | 179/8 A |
| 4,085,293 | 4/1978 | Karras | 179/8 A |

*Primary Examiner*—Gerald Brigance

[57] ABSTRACT

The invention described herein is a traffic measurement device, particularly applicable to telecommunication networks. The device is of the digital type and relies on state transitions caused by the origination and termination of calls. This type of measurement is not vulnerable to inaccuracies of traditional measuring systems, particularly those using scanning methods.

The device requires, theoretically, only three measuring leads common to all servers in the group under consideration, irrespective of the number of servers; one lead transmits a pulse at the time of seizure of a server, the other transmits a pulse at the time of release of a server, and the third transmits a pulse when all servers are busy. The last pulse is used for system initialization and for measurement of congestion.

The basic device integrates the server occupancy states over time by adding the number of scored busy servers in each state a number of times proportional to the duration of the state. The device also facilitates measurement of the variance of the carried traffic or load, which is required together with the mean to describe the characteristics of the traffic distribution such as peakedness or smoothness. Finally, by measuring the duration of congestion and noncongestion periods the device calculates the overflow and offered traffic.

18 Claims, 4 Drawing Figures

TRAFFIC MEASURING DEVICE BASED ON STATE TRANSITIONS

BACKGROUND OF THE INVENTION

In a telephone plant the data required for sizing plant requirements and for monitoring the grade of service in its various parts consist of three main types: Usage, congestion, and number of calls. Three different facilities are usually used to collect that data. The facility for usage measurement consists of traffic usage recorders of which various electromechanical and electronic types are available on the market. They can be broadly classified into two main categories, analog and digital. In the analog, the sum of the current drain of busy servers is continuously monitored. In the digital, the servers are scanned at regular intervals and the number of busy servers is scored on digital counters which sum their number during the period of measurement. The measured load representing the mean of the carried traffic, is expressed in convenient units of telephone traffic such as CCS (hundred-call-seconds) or Erlangs (call hours).

Other special measurements are also used for the monitoring of call congestion. These are: peg count, overflow, all trunks busy (ATB) and last trunk busy (LTB). Overflow measurement consists of scoring the number of call attempts which arrive when all servers in the group under consideration are busy. The ratio of such unsuccessful call attempts to all call attempts (which are measured by another counter, sometimes called a peg count register), is called the grade of service. It is used as a measure of congestion. Theoretically, the grade of service is defined as the limit (as time increases without bound) of the ratio of the overflow and all call attempts. In ATB measurement one counter per group of servers measures the duration of the all servers (trunks) busy (ATB) condition. Similarly, in LTB measurement a counter measures the duration of the last server busy condition. The grade of service can then be obtained from that data by mathematical formula.

Telephone traffic consists of calls which arrive at varying times and occupy the servers for varying durations called call holding times. Each call has an arrival and departure time; the average time between successive call arrivals is called the interarrival time. The mean of the load carried by a group of servers can be determined from the integral over time of a staircase function describing the number of occupied servers or occupancy over time. The result of this integral is then divided by the measurement interval for normalization, yielding the average traffic. The mean of the load can also be expressed as the sum of the duration of all calls in an hourly period or as the product of the number of calls and their average holding time.

In digital traffic measuring systems with scanners the system state is monitored by examining the measuring leads and counting the number of occupied servers at each scan. The mean of the carried load is the average number of occupied servers. This gives an estimate of the integral of the staircase function mentioned above; however, it is apparent that changes in the number of occupied servers can occur between successive scans without being detected, thus resulting in measurement inaccuracies. In addition, a large number of measuring leads are required, one for each server.

The device to be described relies on the state transitions or changes in the state of occupancy, rather than repeatedly scanning and counting the number of occupied servers. In order to accomplish this, the number of occupied servers is detected from the state transitions starting with the known initial state, as will be described in the detailed description herein. Because state transitions are used in the device to determine the state of occupancy, it is not necessary to identify which server lead is involved in a particular state transition.

This allows the use of only three measuring leads for an entire group of servers. One lead provides a pulse when any server is seized, another lead provides a pulse when any server is released, and a third initializes the measuring device by providing a pulse when all servers become occupied.

It is believed that this is the first time that a device has been proposed which utilizes seizure and release pulses, together with ATB or congestion pulses as a means for measuring traffic usage without individually scanning the states of all servers. The device also measures the duration of congestion and noncongestion periods to determine the offered traffic from the carried traffic. In addition, the invention described herein overcomes the problem of establishing the initial condition or the initial state of the serving group by initializing the state of the measuring device through the third lead, indicating that all servers are occupied, at which time the exact number of busy servers is known.

This third lead may either provide a pulse when all servers become occupied or at the first instance that a call is blocked after all servers become occupied. The latter condition is presently used in measuring systems to count the number of blocked or overflow calls.

It should be noted that the term "server" as used in the description of this invention is a general term illustrating the range of applicability of the invention. It is believed that the invention would be particularly useful for measurement of traffic in trunks or circuits associated with calls over telecommunication networks, and therefore specific terms used herein refer to these systems.

LIST OF THE DRAWING FIGURES

SUMMARY OF THE INVENTION

In present-day traffic measuring systems, the mean of the load carried by a group of servers is obtained by counting and averaging the number of occupied servers at regular intervals. This is accomplished by scanners which interrogate the measuring leads, one per server. The average number of occupied servers provides an estimate of the mean of the load expressed in Erlang units of telephone traffic. This scanning method may be classified as a space method in which each server has a distinct location in space, in contrast to the time method used in the subject invention in which the times of origination and termination of calls handled by all servers are indicated. The invention requires, theoretically, the provision of only two measuring leads common to all servers, one indicating the time of server seizure and the other the time of server release. In addition, a third lead per group is also required for initialization at the beginning of the period of measurement. The measurement concept is based on transitions of the states of occupancy which can only vary incrementally, either up or down, thus providing greater economy and accuracy than with present-day systems which do not account for possible variations in occupancy between successive scan intervals. This invention which is based on the concept of state-transitions can provide one facility for the three types of traffic measurements, i.e., usage, congestion and peg counts, as well as measurement of variance.

Figure 1:
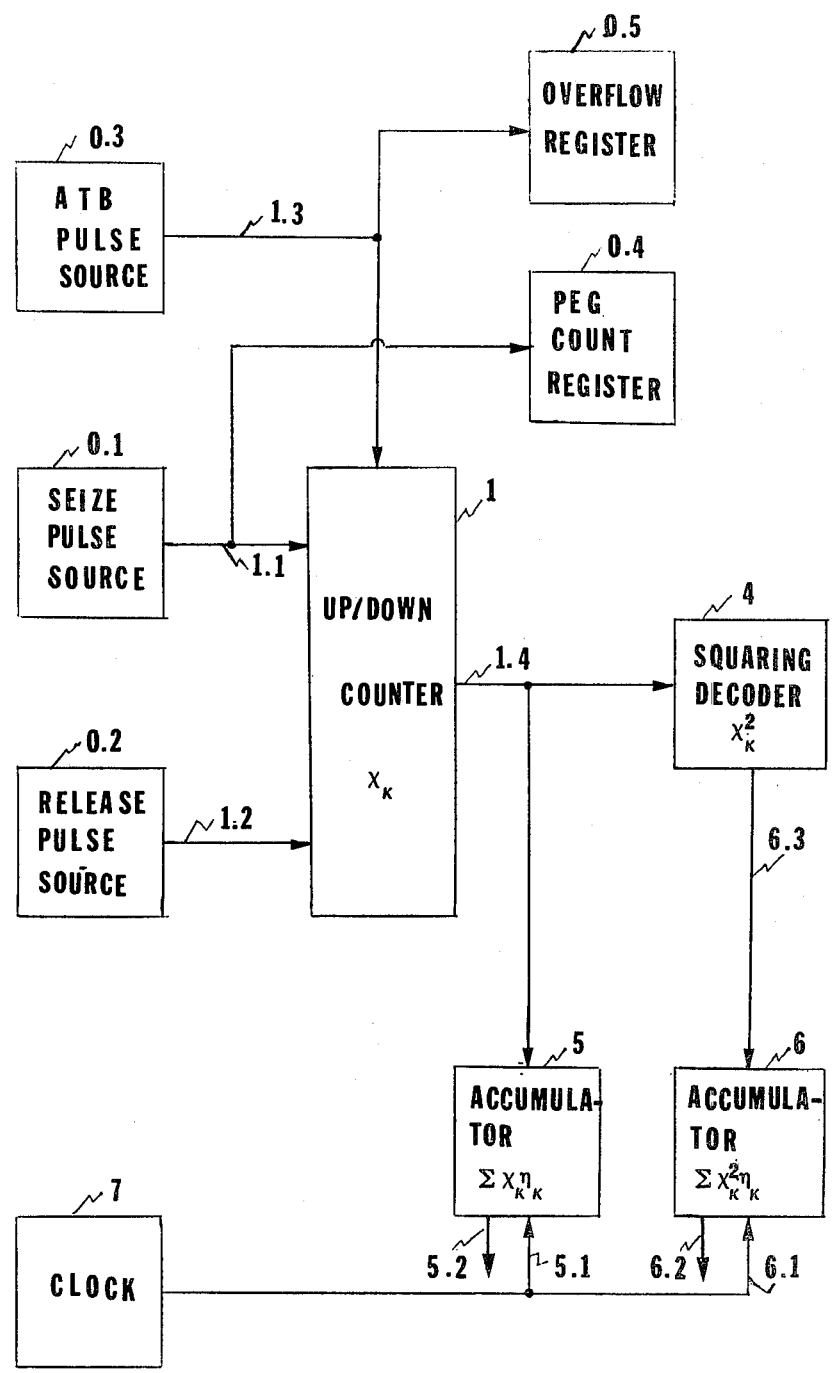
FIG. 1 illustrates the basic concept of the invention and the preferred implementation.
Figure 2:
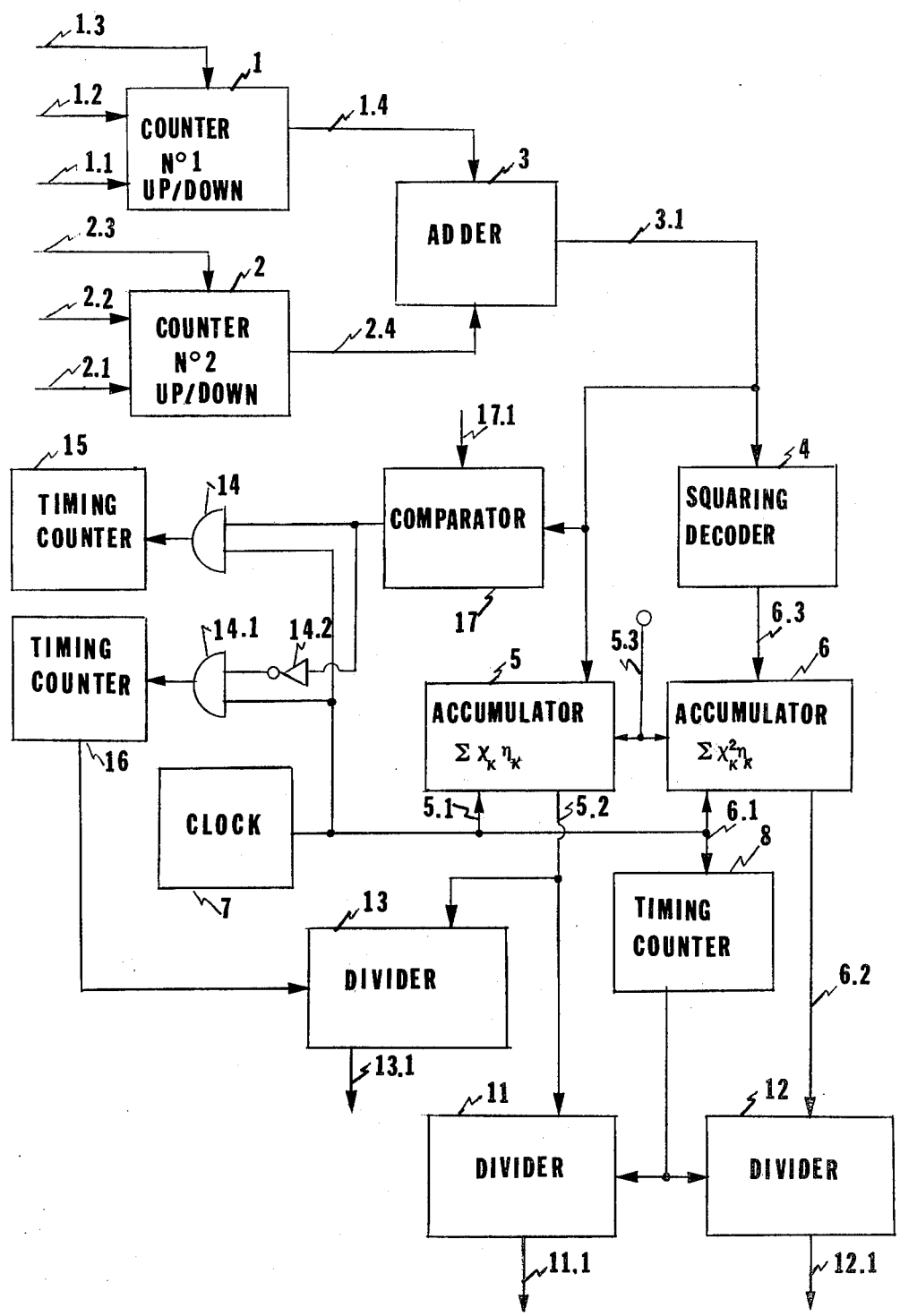
FIG. 2 illustrates the separation of the measured trunk group into two parts and the additional counter required in order to produce faster initialization of the device, as well as to illustrate the method of dividing the output of the accumulators by the number of clock pulses produced over the measurement period.
Figure 4:
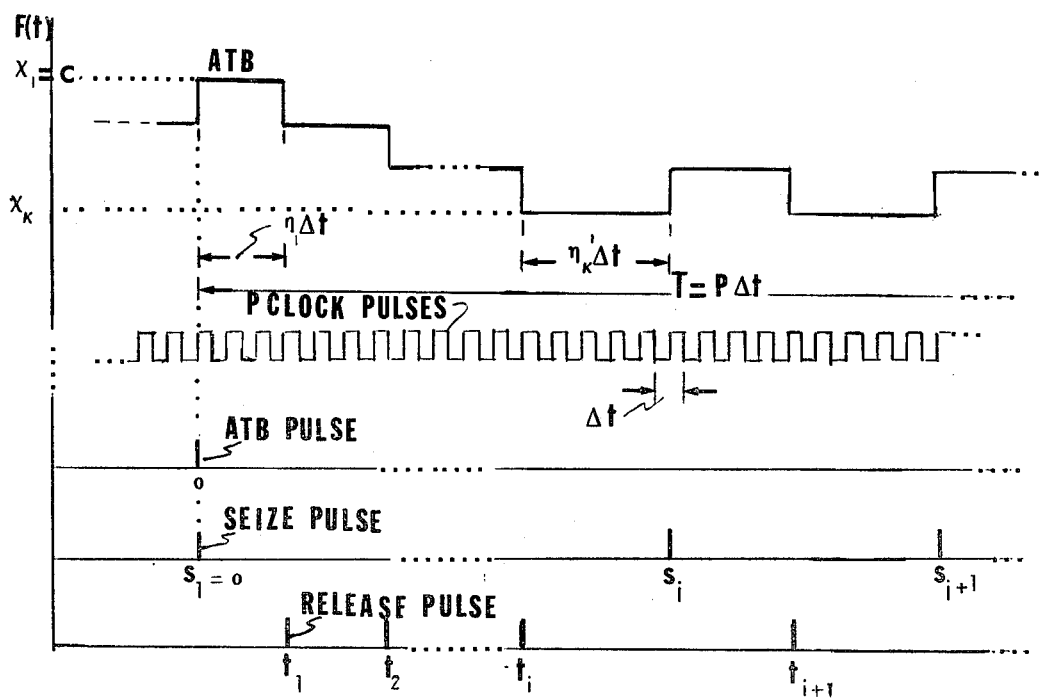
FIG. 4 illustrates the transition state concept as applied to seizure and release of call servers.

The basic concept of the device is illustrated by FIG. 1 which shows three measuring leads required from each server group and by FIG. 4 which shows a typical state transition diagram. The device requires as inputs pulses for each trunk (or server) seizure, for each trunk release, and for an all trunk busy (ATB) condition. Measuring leads from the serving (trunk) group to count the number of call attempts and congestion (or overflow) counters are presently available in most serving groups where such measurements are required. Because it may take some time for a particular serving group to exhibit an ATB condition, particularly for underloaded groups, it may be desirable to split the group into two parts as shown in FIG. 2, each part using a separate ATB lead rather than one ATB lead for the whole group to initialize the device. This is described further in the detailed description of the invention. Because call counts (trunk seizure pulses) are already available along with the ATB pulses, it is only necessary to additionally provide call release pulses to make the device operable.

The simplified basic configuration, shown in FIG. 1, consists of an up/down counter which is triggered to increment and decrement its count by the seizure and release pulses respectively, binary accumulators which add the values (and their squares) in this counter, and a clock which provides pulses to enable the accumulator(s). By providing a clock which produces $2^n$ pulses per hour where $2^n = P$, it is possible to shift the decimal point in the accumulated sum n places to the left, so as to perform the required division of the accumulated sum by the number of clock pulses in the hour. (The number of clock pulses corresponds to the number of accumulates.) This may also be accomplished by a separate counter to count the number of clock pulses and by a divider to divide the sum in the accumulator by the value in the counter, as illustrated in FIG. 2. The result represents the integration of the transition states over the time of measurement, or the average carried traffic over that period.

Because an integral requires an initial condition to be properly evaluated, it is necessary to preset the up/down counter to the number of servers busy at the start of the measurement interval. This is accomplished by presetting this counter to the number of occupied servers which is known at the time of the ATB condition. Each successive counter state will then represent the exact number of busy servers at any subsequent time. Repeated addition of the up/down counter state a number of times proportional to the duration of the state is accomplished by the clock pulses through an accumulate enable input of accumulators and gives the piecewise integration of the staircase transition state function which is normalized by dividing by the number of clock pulses during the period.

Two separate counters are used to separately count the number of clock pulses which occur during the all servers busy (congestion) period and during the noncongestion period. The number of clock pulses during the noncongestion period, (M), is then divided into the accumulator total to give the offered traffic. The number of clock pulses during the congestion period, (P-M) divided by the total number of clock pulses P gives the probability of time congestion.

Because the ATB (congestion) pulses required to initialize the system may not occur frequently enough, particularly in the case of underloaded groups, a scheme employing two counters and an adder may be required. This is illustrated in FIG. 2. Each of the counters shown is used to monitor busy trunks on half of the circuits in the group where the all trunks busy (ATB) condition on each part rather than the ATB condition for the whole group is used to initialize the counters. Because it is more probable for part of the circuits or servers to be simultaneously occupied than all the servers in the group, this scheme would result in counter initialization much sooner than the simplified scheme in FIG. 1.

Once the device is initialized and the transition states are known, the mean and variance of the traffic can be calculated by two methods, either by integrating the states over time or by taking the difference between the sum of the release and the sum of the seizure times. In the latter method correction for the calls in progress at the end of the observation period is necessary.

The following formulas are used to describe the calculation of the mean and variance of the carried traffic using the integration approach:

$$\mu = \frac{1}{P\Delta t} \sum_{k=1}^{N} x_k n_k \Delta t = \frac{1}{P} ( \sum_{k=1}^{N} x_k n_k )$$

$$\sigma^2 = \frac{1}{P\Delta t} ( \sum_{k=1}^{N} x_k^2 n_k \Delta t ) - ( \frac{1}{P\Delta t} \sum_{k=1}^{N} x_k n_k \Delta t )^2$$

where
N = # transition states during measurement period
P = Total No. clock pulses generated during measurement interval
$x_k$ = # servers busy during state k
$n_k$ = # clock pulses during state k
$\Delta t$ = clock pulse duration
$\mu$ = Mean of carried traffic
$\sigma^2$ = Variance of carried traffic An alternate implementation for measuring the traffic using the basic concept described above is illustrated in FIG. 3. Using this approach the traffic is measured as the difference of the sum of release times and the sum of seize times of all servers. An adjustment must then be made for those calls which are in progress at the beginning and end of the measurement period. This is illustrated by the following formula:

$$\mu = \frac{1}{T - S} ( \sum_{i=1}^{N} t_i - \sum_{j=1}^{N} s_j + N_2 T - N_1 S )$$

where
N = Number of calls which begin and end during the measurement interval $t_i$ = trunk release time of ith call
$s_j$ = trunk seize time of jth call
$N_2$ = Number of calls in progress at the end of the measurement period
$N_1$ = Number of calls in progress at the start of measurement period
T = End time of measurement period
S = Start time of measurement period
$\mu$ = Mean of carried traffic It should be noted that division of the above results by the number of call arrivals during the measurement period would give the average holding time of the calls.

Figure 3:
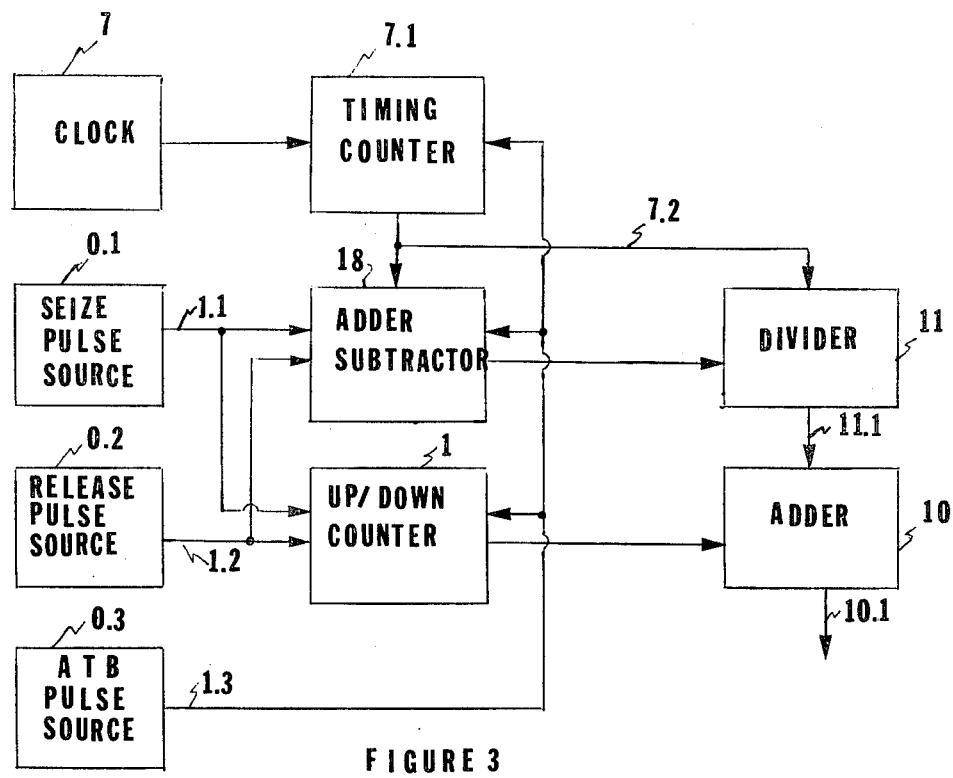
FIG. 3 illustrates an alternative embodiment of the invention based on the same measurement concept.

FIG. 3 illustrates the embodiment of the above scheme. A clock and timing counter is used to monitor the current time which is either added to or subtracted from the accumulated total, depending whether a call arrival (seize) or call departure (release) occurs. Appropriate dividing and adding components are shown which make the correction for calls present at the end and beginning of the period. Since the start time (S) of the measurement, as expressed in the above equation, is made to be zero by appropriately resetting the timing counter, the term ($N_1S$) above relating to calls at the start of the measurement period drops out, thus simplifying the formula. As shown in FIG. 3 initialization of the counters occurs when it is known that all measured trunks are busy, corresponding to times when call overflows are registered, indicating call congestion.

DETAILED DESCRIPTION OF THE INVENTION

The device to be described is based on the concept of state-transitions in the occupancy of trunks or servers, caused by the arrival and termination of calls. During a very short interval of time, only one event may occur to change the state; either a new call arrives and occupies an idle server which increments the state by one, or a call terminates, releasing a server which decrements the state by one. The number of occupied servers in any state can be established from the state transitions, if the number of occupied servers at the beginning of the period of measurement is known. This is accomplished by starting the measurement at the instant when the number of occupied servers is known, indicated by the condition when all servers are busy and referred to in trunking systems as the "all trunk busy" (ATB) condition. The number of occupied servers in each state can, therefore, be successively established starting from the initial state. In addition to the ATB lead required for system initialization, the transition states can be indicated by only two measuring leads per group of servers, regardless of the number of servers; one lead provides a pulse when a server is seized and the other provides a pulse when a server is released. The duration of each state is also determined from the seizure and release times of the servers. Once the number of occupied servers in each state and the duration of the state are known, the mean of the carried load becomes simply the integral of the occupied servers over time during the period of measurement, normalized (divided) by the measurement interval.

FIG. 4 illustrates the concept of state transitions, as it applies to the subject device. Measurements begin when an ATB and seize pulse occur simultaneously, as shown on the second and third lines from the bottom in the figure. The first state $x_1 = c$ caused by the ATB condition continues for a period of time $n_1\Delta t$ where $n_1$ is the number of clock pulses of fixed duration $\Delta t$ which are generated during the state $X_1$. At time $t_1$ a release pulse occurs, as shown on the bottom line in the figure. This causes the number of occupied servers to be decreased by one, as illustrated in the staircase function, F(t), shown at the top of the drawing. The process continues at each subsequent seize or release pulse where seize times of servers are indicated by $s_j$ and release times by $t_i$.

The integral of the state transition function F(t) can be obtained as the sum of the states $x_k$ (number of busy servers in state k) weighted by the state duration $d_k$ or simply expressed as $$\sum_{k=1}^{N} x_k d_k.$$

Dividing this result by the total period of measurement, T, we get the total traffic carried by all servers.

The abscissa or time axis shown in FIG. 4 is divided into discrete segments of time $\Delta t$ by the clock pulses, so that the duration of the kth state, $d_k$, may be expressed as $n_k\Delta t$ where $n_k$ is the number of clock pulses produced during the kth transition-state.

The result of this calculation yields the carried traffic, which may be expressed as:

$$\mu = \frac{1}{P\Delta t} \sum_{k=1}^{N} X_k n_k \Delta t = \frac{1}{P} \Sigma X_k n_k$$

Similarly, the variance of the carried traffic would be:

$$\sigma^2 = (\frac{1}{P\Delta t} \sum_{k=1}^{N} X_k^2 n_k \Delta t) - (\frac{1}{P\Delta t} \sum_{k=1}^{N} X_k n_k \Delta t)^2$$

where $x_k$ is the number of busy servers during the kth state, P is the number of clock pulses of duration $\Delta t$ during the measurement period, $n_k$ is the number of clock pulses during the kth state, and N is the total number of transition states over the measurement period.

The mean of the carried traffic may also be calculated as the difference of the sum of server release times $t_i$ and the sum of the seize times $s_j$ as illustrated by pulses shown at the bottom of FIG. 4. It should be apparent that this result is the same as separately calculating the duration of each call which starts and ends during the measurement period and summing the respective lengths. An adjustment must be made, however, for calls which start or end outside the measurement period and continue during a portion of the measurement period, by assuming that such calls start at exactly the beginning of the period or terminate at exactly the end of the period. The following formulas use this information and relate the mean and variance of the carried traffic to the start and terminate times of calls as shown below:

$$\mu = \frac{1}{T-S}(\Sigma t_i - \Sigma s_j + N_2 T - N_1 S)$$

$$\sigma^2 = \frac{1}{T-S}(\Sigma t_i^2 - \Sigma s_j^2) - (\frac{1}{T-S}(\Sigma t_i - \Sigma s_j) + N_2 T - N_1 S)^2$$

where:

$\mu$ is the mean of the carried load and $\sigma^2$ is its variance;

S is the start time of the observation period;

T is the end time of the observation period; $s_j$ is the seize time of call j;

$t_i$ is the release time of call i;

$N_1$ is the number of occupied servers at the beginning of the observation period;

$N_2$ is the number of occupied servers at the end of the observation period;

N is the number of transition states during the measurement period.

This formula results from the fact that it is not necessary to pair the start time of each call with its own end time to obtain the total call time per hour (which is the traffic handled). Instead, call terminate times can be added and call start times can be subtracted sequentially from the accumulated total. This simplifies the embodiment presented in FIG. 3 of this description and enables measurement of traffic on all servers with only three measuring leads.

It should be noted that calculation of the traffic from the transition states using either of the above methods yields the same result. FIGS. 1 and 2 show the basic implementation using the integration approach described above. FIG. 3 illustrates an alternate implementation based upon the sum of durations of all calls (which is equivalent to the sum of the release times less the sum of the size times of servers during the observation period). It will be shown that this implementation requires an adjustment for calls which are present at the start and end of the observation period. For clarity the basic elements comprising the device are shown as single digit numbers with appropriate subparts indicated with a decimal point and a second digit. Common elements in the figures are indicated by the same numeral.

The basic invention using the state transition method is illustrated by FIG. 1. It consists of up/down counter (1) whose count can be incremented or decremented through input leads (1.1) and (1.2) respectively, a squaring decoder (4) which squares the values scored in up/down counter (1), two accumulators, (5) and (6), which store sums and sums of squares respectively of the values scored in up/down counter (1) and the values produced by the squaring decoder (4), and a clock (7) which enables the accumulators via leads (5.1) and (6.1). Three input sources transmit pulses to counter (1). They are: seize pulse and interface (0.1), release pulse and interface (0.2) and ATB pulse and interface (0.3). Except for the release pulses, the seize and ATB pulses are used in conventional measuring devices for peg count and overflow measurements, as shown in FIG. 1 by blocks (0.4) and (0.5), respectively. Circuitry and components for producing pulses when server seizure or the ATB condition occurs are well known in the Art. Generally, a separate set of contacts of relays or their equivalent which control server seizures and indicate the ATB condition (or congestion) are used to provide the necessary pulses. Each group of servers would have one common seize lead, one common release lead and one common ATB lead producing pulses indicating the traffic activity. If it is desired to monitor the traffic simultaneously, on a number of cooperating server groups forming a network cluster, up/down counters (1) of the groups in the cluster can feed accumulators (5) and (6) which are common to all groups in the cluster through one or more adder (3) as illustrated in FIG. 2. This same configuration is described later in this description where it is shown that an individual trunk group can be split into two or more parts to speed up initialization of the device. The use of the three measuring leads enables usage measurement which heretofore has been only available by scanning the usage measuring leads of all servers in addition to providing separate facility for peg count and overflow measurement, if desired.

The ATB pulse (0.3) presets up/down counter (1) through input lead (1.3) to the total number C of servers in the group being measured. The output of up/down counter (1) is connected to an accumulator (5) for summing values in the counter, and is connected to accumulator (6) through squaring decoder (4) and input lead (6.3) for summing the squares of values in the counter. The clock (7) provides enable pulses to the two accumulators (5) and (6) through enable inputs (5.1) and (6.1), in order to repeatedly add at a rate determined by clock (7), the value stored in up/down counter (1), a number of times proportional to the duration of each state scored in up/down counter (1). Outputs (5.2) and (6.2) of the accumulators must then be divided by the number of pulses, P (accumulate enables) produced by the clock during the measurement period to give the correct measure of the traffic. This is easily accomplished by providing a clock, generating $2^n$ pulses per hour, where $2^n = P$, the total number of pulses in the period of measurement, and setting the decimal point in the result shown in the accumulators n places over from the right hand digit. The use of the accumulator (6) giving the sum of squares of states scored in the up/down counter (1) will facilitate calculation of the variance of the carried load. After the up/down counter (1) is preset to the initial state (corresponding to the number C of trunks or servers in the measured group) through preset enable lead (1.3), it will continue to monitor successive states. The device described interrogates the states scored in up/down counter (1) and repeatedly adds and stores in accumulator (5) at a rate predetermined by the clock (7). The number of times the states are added is scored in the clock pulse (timing) counter (8) shown in FIG. 2. The piecewise sum of the states scored in accumulator (5) and their squares scored in accumulator (6) is then divided by the value indicated in the clock pulse timing counter (8) using the dividers (11) and (12). It should be noted that accumulators (5) and (6) must be reset at the start of the measurement, through lead (5.3).

One of the key elements of the invention is initialization of the up/down counter(s) from the ATB condition which is presently used in measuring systems to indicate group congestion. Because it is known that all servers are busy when this condition occurs, it is only necessary to preset the up/down counter (1) and the accumulators (5) and (6) illustrated in FIG. 1 to the number of servers busy at that instant. However, in the case of underloaded groups, the ATB condition may occur too infrequently to make rapid initialization feasible. In such cases, as shown in FIG. (2), separate up/down counters (1) and (2) and adder (3) are used to monitor the states in separate halves of the server group. Each part is, in effect, treated as a separate subgroup. Each up/down counter (1) and (2) is connected to seize leads (1.1) and (2.1) for count incrementing, and release leads (1.2) and (2.2) for count decrementing. Separate ATB leads (1.3) and (2.3) are provided for each subgroup so that the first up/down counter (1) may be preset at a different time than the second up/down counter (2). Because the probability of servers in one subgroup to be simultaneously busy is much higher than that in both subgroups together, initialization of the up/down counters (1) and (2) will occur much sooner than if one counter is used for the entire group as shown in FIG. 1. An adder (3) summing the states in the two up/down counters (1) and (2) through leads (1.4) and (2.4) provides the required combined output through lead (3.1) to the squaring decoder (4) and accumulators (5) and (6), through leads (3.1) and (6.3).

It is usually desirable to measure the traffic "offered" to a group of trunks or servers in addition to the carried traffic. The description to this point has emphasized measurement of the carried traffic. FIG. 2 illustrates several additional components for measuring the "offered" traffic based upon the relative duration of the congestion and noncongestion periods. It should be noted that the offered traffic can be calculated from the carried traffic by the following formula $A=a/(1-B)$, where A is the offered traffic, a is the carried traffic and B is the proportion of the congestion. The duration of the congestion period is often referred to as the time congestion, as opposed to the number of blocked calls, yielding the call congestion. The proportion of overflow traffic can then be determined by dividing the total congestion time by the total measurement period. Similarly, the proportion of carried to total offered traffic is determined by dividing the noncongestion time by the total measurement period. The "offered" traffic is then simply the measured carried traffic divided by the proportion of noncongestion time.

Since the device described utilizes numbers of clock pulses $n_k$ to measure durations of time ($n_k \Delta t$), for each up/down counter state, it is simply necessary to provide comparator (17) which compares the total number of servers busy indicated by the sum of values in up/down counters (1) and (2) at the output of the adder (3) to the known total number of trunks in the group, provided at input (17.1). When the all servers or trunks busy condition is met, the output of the comparator goes to a high logic level which is connected directly to AND gate (14) and to AND gate (14.1) through inverter (14.2). The other input of these and gates is provided from the system clock (7). The resulting output clock pulses of gate (14) drives a timing counter (15) only when the servers are all occupied, indicating a congestion state. Similarly, the output of gate (14.1) drives another timing counter (16) when the servers are in a noncongestion state. The value scored in counter (16) is the number of clock pulses (M) produced during the noncongestion state when at least one server is idle. This result is fed into the divisor input of an additional divider (13) whose dividend input is connected to the output of the accumulator (5) which stores the sum $\Sigma x_k n_k$, where $x_k$ denotes the previously mentioned occupancy level of the kth state and $n_k$ denotes the number clock pulses produced during that state. The output (13.1) of divider (13) thus provides the mean of the offered traffic which can be expressed as $(x_k n_k)/M$ where M is the number of clock pulses occuring during the noncongestion period. The percent of call overflow (blocking) can similarly be calculated from the value in timing counter (15) divided by the value P (total number of clock pulses during measurement period) in counter (8); however, the additional divider needed is not shown in FIG. 2.

FIG. 3 illustrates an alternative configuration for measuring traffic usage, using the three measuring leads of the basic device illustrated in FIG. 1. This scheme is based on the fact that the mean of the carried load is equal to the normalized difference between the sum of the times of call terminations (releases) and the sum of the times of call origination (seizures). A correction must be made to compensate for calls whose start or terminate times are outside the measurement period. The device consists of a clock (7) connected to a timing counter (7.1) which keeps track of the event time (#clock pulses), an adding/subtracting means (18) which either adds the value in timing counter (7.1) to the value accumulated in the adder/subtractor (18) or subtracts the value in the counter (8) from the value accumulated in the adder/subtractor (18). This is controlled through the release pulse lead (1.1) which triggers additions and the seize pulse lead (1.2) which triggers subtractions. Leads (1.1) and (1.2) are also connected to the up count and down count inputs, respectively, of the up/down counter (1) which keeps track of the number of busy servers over time. An input lead (1.3), from ATB or congestion condition pulse source (0.3), indicating the ATB condition, connects to the preset enable input of the up/down counter (1) and to the adder/subtractor (18) reset input and timing counter (8.1) reset input. Input lead (1.3) thus initializes the system when the ATB condition or call congestion occurs. To correct for calls which originate or terminate outside the period of measurement, but continue during a portion of the measurement interval, it is necessary to assume that such calls had their origination or termination time at the beginning and ending of the period of measurement, respectively. It would then be necessary to add to the values scored in the adder/subtractor (difference between sum of call terminate times, $t_i$ and sum of call seize $s_j$ times, $(\Sigma t_i - \Sigma s_j)$), the number of calls in progress, $N_2$ at the end of the period of measurement multiplied by the time T at the end of the period of measurement and to subtract from this value the number of calls in progress, $N_1$, at the beginning of the period of measurement multiplied by the time S at the beginning of the period. This is expressed mathematically as $(\Sigma t_i - \Sigma s_j + N_2 T - N_1 S)$. It then would be required that this result be divided by the total period of measurement to obtain the mean of the carried load. Because the timing counter (7.1) is reset at the beginning of the measurement period, the above expression can be simplified with the start time S equal to zero. The normalized expression for the mean of the traffic therefore becomes:

$$\mu = \frac{1}{T}(\Sigma t_i - \Sigma s_j) + N_2$$

where $\Sigma t_i$ is the sum of time of termination of all calls, $\Sigma s_j$ is the sum of the time of origination of all calls, $N_2$ is the number of calls in progress at the end of the period of measurement and T is the period of measurement.

To achieve this result the device uses a divider (11) to divide the value scored in the adder/subtractor (18) by the value scored in the timing counter (8). This is shown in FIG. 3 where outputs from timing counter (7.1) and adder/subtractor (18) are connected to divisor and dividend input ports, respectively, of the divider (11). The output of the divider (11) and the output of the up/down counter (1) are connected to the adder (10) inputs, yielding the sum of these quantities at the adder output lead (10.1). The resulting output of the adder (10) gives the quantity $$\frac{1}{T}(\Sigma t_i - \Sigma s_j) + N_2$$

shown above which represents the mean of the measured load. The variance of the load can also be measured using this embodiment in similar manner, but the details will not be described here.

While the invention has been particularly shown and described with reference to preferred embodiments thereof, it will be understood by those skilled in the art that various changes in form and details may be made therein without departing from the spirit and scope of the invention.

What is claimed is:

1. In a traffic measuring system a device enabling the continuous measurement of average server occupancy, often referred to as the traffic, over a measurement interval which may also be referred to as a measurement period, defined as beginning when all monitored servers have simultaneously become occupied, said condition also termed a server congestion state, and ending at any desired time when traffic observations are made, utilizing seize pulses, each of which indicates that a server has become occupied, all servers busy pulses also referred to herein as congestion pulses, each of which indicates that a congestion state has been reached, and release pulses, each of which indicates that a server has been released from use to measure traffic on a group of servers without requiring the scanning of individual servers, and thereby reducing the required number of measuring leads to measure traffic usage, comprising:

an up/down counting means including a first input means driven by said server seize pulses for incrementing count of said up/down counting means, a second input means driven by said server release pulses for decrementing count of said up/down counting means, and a third input means driven by said all servers occupied pulses for enabling count of said up/down counting means to be preset to a predetermined value, and count output means for indicating counting state of said up/down counting means;

an accumulating means, which continuously records and updates a non-normalized value of average server occupancy expressed mathematically as $\Sigma X_k d_k$, where $X_k$ is the server occupancy state at the kth instant of time and $d_k$ is a measure of the duration of said occupancy state during said measurement interval, including a data input means, a data output means, and an accumulate enable input means for triggering accumulation of data present at said data input means;

a clock means, producing a uniform pulse train;

connecting means between said count output means of said up/down counting means and said data input means of said accumulating means; and a connecting means between output of said clock means and accumulate enable input means of said accumulating means allowing accumulation of values scored in said up/down counting means at every clock pulse during said measurement interval, so that each state scored in said up/down counting means is added in said accumulating means a number of times proportional to duration of said state.

2. The device described in claim 1 wherein telephone traffic is measured and wherein said servers comprise telephone trunks, using trunk seizure, trunk release, and all trunks busy leads from a measured trunking system so that the trunk seize lead, trunk release lead, and all trunks busy lead provide the required seize, release, and congestion pulses, respectively, through buffering and interfacing means, where said congestion pulse occurs when all servers become occupied and presets said up/down counting means to a predetermined value equal to number of trunks in said measured serving group.

3. The device described in claim 1 further including a squaring decoding means, including data input and output means, for squaring count output of said up/down counting means described in claim 1;

a second accumulating means including a data input means, a data output means and an accumulate enable input means for triggering accumulation of data present at said data input means;

connecting means between said count output means of said up/down counting means and said data input means of said squaring decoding means;

connecting means between said data output means of said squaring decoding means and said data input means of said second accumulating means; and a connecting means between said clock means, described in claim 1, and said accumulate enable input means, to facilitate measurement of variance of carried traffic by accumulating squares of each state scored in said up/down counting means a number of times proportional to the duration of said state, where the value accumulated in said second accumulator means can be expressed mathematically as $$\sum_{k=1}^{N} x_k^2 n_k,$$

where N is the number of up/down counter states over said measurement interval, $x_k^2$ is the square of the number of servers occupied during the $k_{th}$ counter state, squared, $n_k$ is the number of clock pulses occuring during the $k_{th}$ state scored in said up/down counting means and P is the total number of clock pulses generated over said measurement interval, with k used as a standard subscripting variable.

4. The device described in claim 1 further including a counter timing means, which is reset at the start of said measurement interval and indicates elapsed measurement time, including a count input means which is connected to said clock means, for continuously counting the number of clock pulses during said measurement interval; and a dividing means with divisor input means connected to output of said counter timing means and dividend input means connected to said data output means of said accumulating means so as to produce the value in said accumulating means divided by the number of clock pulses occurring during said measurement interval, in order to normalize the value in said accumulating means by the length of said measurement interval, which can be expressed mathematically as $$\frac{1}{P} \sum_{k=1}^{N} x_k n_k$$

and may be referred to as the carried traffic, where P is the total number of clock pulses during said measurement interval, N is the total number of up/down counter transition states over said measurement interval, $n_k$ is the number of clock pulses generated during the $k_{th}$ up/down counter state and $x_k$ is the number of servers occupied during the $k_{th}$ state.

5. The device described in claim 1 further including a comparator means including a first data input means which is connected to said count output of said up/down counting means and a second data input means which is preset to the total number of measured servers and an output means whose logic level indicates whether any servers are unoccupied connected to first input of a control gating means through inverting means, where a low logic level at output of said comparator means indicates that at least one server is unoccupied, where second input of said control gating means connects to said clock means and where output of said control gating means which provides clock pulses during noncongestion periods when at least one server is unoccupied connects to a counter timing means, and where said counter timing means counts clock pulses during noncongestion periods, when at least one server is unoccupied.

6. The device described in claim 5 further including:
a dividing means including a divisor data input means, a dividend data input means and a quotient data output means for dividing said data output of said accumulator means by count output of said counter timing means;
connecting means between output means of said counter timing means and divisor data input means of said dividing means; and
connecting means between said data output means of said accumulator means and said dividend data input means of said dividing means, where the result obtained can be described as the traffic offered to said group of servers and can be expressed mathematically as $$\frac{1}{M\Delta t} \sum_{k=1}^{N} x_k n_k \Delta t$$

where N is the number of up/down counter transition states over the period of measurement, M is the number of clock pulses generated during noncongestion periods, $\Delta t$ is the clock pulse duration, $x_k$ is the number of servers occupied in the kth state, and $n_k$ is the number of clock pulses generated during the kth transition state.

7. The device described in claim 1 wherein said accumulating means further includes a reset input means to reset stored value in said accumulating means to zero at the start of said measurement interval.

8. The device described in claim 1 wherein said accumulating means is reset to zero prior to the start of said measurement interval and whose stored data is adjusted after the start of said measurement interval to enable the inclusion of measurements made prior to said measurement interval in said accumulating means.

9. A traffic measuring device for continuously integrating the function describing server occupancy states of a group of servers over a measurement period defined as beginning when all servers have been simultaneously occupied and ending at the time of traffic observation to yield the traffic carried by said servers and for dividing said integrated result by the duration of time that said servers are not all occupied to yield the traffic offered to said group of servers, utilizing pulses produced when any server in said group becomes occupied, pulses produced when any server in said group becomes idle and pulses produced when all servers in said group become occupied, comprising;
an up/down counter means including a count increment means which is connected to a first pulse input source where pulses are produced by server seizure, a count decrement means which is connected to a second pulse input source where pulses are produced by server release, and a preset enable means which is connected to a third pulse input source where pulses are produced when all servers are occupied, and a count output means;
an accumulator means including a data input means, an accumulate enable input means for triggering accumulation of data present at said data input means, and a data output means;
a clock means producing a pulse train to drive said accumulate enable input means;
a comparator means including a first and a second data input means and a logic output means for providing a logic level to indicate whether said up/down counter count output is equal to number of servers in group being measured;
a timing counter means, including a count increment input means and count output means, which counts the number of clock pulses during the server noncongestion periods when at least one server is unoccupied over said measurement period;
a control gating means, including first and second input means and output means for allowing pulses from clock means to be applied to said timing counter means during periods of server noncongestion;
a dividing means including a divisor data input means, a dividend data input means and a quotient data output means for dividing said data output of said accumulator means by count output of said timing counter means;
connecting means between said count output means of said up/down counter means and said data input means of said accumulator means;
a connecting means between said clock means and said accumulate enable means to cause accumulation of sum of each value scored in up/down counting means a repeated number of times proportional to the duration that said value is present in said up/down counting means;
a connecting means between said clock means and first input of said gating means;
a connecting means between said output means of said up/down counter means and said first data input means of said comparator means;
a connecting means between said second data input means of said comparator means and data source equivalent to number of servers being measured;
connecting means between said logic output of said comparator means and said second input means of said control gating means providing a logic level indicating whether count stored in said up/down counter is equal to number of servers being measured;
a connecting means between output of said control gating means and said timing counter count increment input means;
connecting means between output means of said timing counting means and divisor data input means of said dividing means; and connecting means between said data output means of said accumulator means and said dividend data input means of said dividing means, where the result obtained may be referred to as the offered traffic and can be expressed mathematically as $$\frac{1}{M\Delta t} \sum_{k=1}^{N} x_k n_k \Delta t,$$

where N is the number of up/down counter transition states over the period of meansurement, M is the number of clock pulses generated during said non-congestion periods, $\Delta t$ is the clock pulse duration, $x_k$ is the number of servers occupied in the $k_{th}$ state, and $n_k$ is the number of clock pulses generated during the kth transition state.

10. The device described in claim 9 above further including an additional counting means with count incrementing input means and a count output means, said count incrementing input means connected to said clock means for counting all clock pulses during said measurement period;

an additional dividing means with a divisor and a dividend input data means and a quotient output data means for dividing value retained in said accumulating means by total number of clock pulses generated during said measurement period;

connecting means between said divisor input data means and said count output means of said additional counting means; and connecting means between said dividend input data means and said data output means of said accumulator means, where carried traffic based upon average server group occupancy is monitored at quotient output of said additional dividing means.

11. In a traffic measuring system a device enabling the continuous measurement of traffic carried by a group of servers over a measurement period defined as beginning when all servers are simultaneously occupied and ending when traffic observations are made by adding server release times and subtracting server seizure times from an accumulated total of said times, and by compensating for servers occupied at the start and end of said measurement period, comprising:

a clock means providing a uniform train of pulses driving count input of a timing counting means which monitors elapsed measurement time during said measurement period, said timing counting means including output means;

an adder/subtractor accumulating means which either adds or subtracts the contents of said timing counting means from its accumulated total, including a data input means, an add enable input means, a subtract enable input means and a data output means for adding contents of said timing counting means at data input means to its accumulated total when a pulse is present at said add enable input means and for subtracting contents of said timing counting means at data input means from said accumulated total when a pulse is present at said subtract enable input means;

connecting means between said timing counting means and said data input means of said adder/subtractor accumulating means to allow times of server seizure to be subtracted from said accumulated total and time of server release to be added to said accumulated total;

a connecting means between said add enable input means of said adder/subtractor accumulating means and a pulse source producing pulses upon server release; and a connecting means between said subtract enable input means of said adder/subtractor accumulating means and a pulse source producing pulses upon server seizure, where the result retained in said adder/subtractor accumulating means can be expressed mathematically as $$\sum_{i=1}^{A} t_i - \sum_{j=1}^{B} s_j$$

where $t_i$ is the time of server release for the ith release during said measurement period, $S_j$ is the time of server seizure for the jth seizure during said measurement period, A is the total number of server releases and B is the total number of server seizures during said measurement period.

12. The device described in claim 11 further including an up/down counting means including a first input means for incrementing its count, a second input means for decrementing its count an input enable means for presetting its count to a predetermined value, and an output means;

a dividing means including a divisor data input means, a dividend data input means and a quotient data output means for dividing result stored in said adder subtractor accumulating means described in claim 9 by current time stored in said timing counting means;

an adding means including a first and second addend data input means and a data output means for adding data output from said quotient data output means of said dividing means to count from said output means of said up/down counting means;

a connecting means between said first input means of said up/down counting means and said subtract enable input means of said adder/subtractor accumulating means;

a connecting means between said second input means of said up/down counting means and said add enable input means of said adder subtractor accumulating means;

connecting means between said output means of said adder/subtractor accumulating means and said dividend data input means of said dividing means;

connecting means between said output means of said timing counting means described in claim 12 and said divisor data input means of said dividing means;

connecting means between output means of said up/down counting means and said first addend input means of said adding means; and connecting means between said quotient output data means of said dividing means and said second addend input means of said adding means, with said quotient output data means yielding the traffic carried by said measured servers, said result mathematically expressed as $$\frac{1}{T-S} \left( \sum_{i=1}^{A} t_i - \sum_{j=1}^{B} s_j + N_2 T - N_1 S \right),$$

where T is the count in said timing counter at the end of said measurement period, S is the count in said timing counter at said start of said measurement period, $N_2$ is the value stored in said up/down counting means at the end of the measurement period, $N_1$ is the value stored in said up/down counting means at the start of said measurement period, A is the total number of server releases during said measurement period, and B is the total number of server seizures during said measurement period.

13. The device described in claim 12 wherein said adder/subtractor accumulating means further includes a reset input means for resetting its accumulated total to zero; wherein said up/down counting means further includes a preset enable input means connected to a pulse source producing pulses when all servers are occupied to preset value in said up/down counting means to a value equal to number of servers in measured group; and where said timing counting means further includes a reset input means where reset pulses are applied to said timing counting means and said adder/subtractor accumulating means so that the value at the data output of said adding means can be expressed as $$\frac{1}{T}\left(\sum_{i=1}^{A} t_i - \sum_{j=1}^{B} s_j\right) + N_2,$$

where $N_2$ is the number of servers occupied at the end of said measurement period, T is the length of said measurement period, $t_i$ is the termination time of the ith termination, $S_j$ is the seize time of the jth seizure, A is the number of terminations, and B is the number of seizures all during said measurement period.

14. A traffic measuring device enabling the continuous measurement of the combined average server occupancy on a plurality of separately monitored server subgroupings over a measurement interval, also termed the measurement period, defined as beginning after servers in each separate server subgroup which have been separately observed become simultaneously occupied and ending at the desired time of traffic observation, utilizing from each of said server subgroupings server seize pulses, each of which indicates that a server has become occupied, server release pulses, each of which indicates that a server has become unoccupied and server congestion pulses, each of which indicates that all servers in a server subgrouping have become occupied, comprising:

a plurality of up/down counting means, each of which monitors the occupancy state of one of said server subgroupings and each of which includes a first input means driven by said seize pulses from said server subgrouping for incrementing count of said up/down counting means, a second input means driven by said release pulses from said server subgrouping for decrementing count of said up/down counting means, a third input means driven by said server congestion pulses from said server subgrouping for enabling the count of said up/down counting means to be preset at a predetermined value, and count output means for indicating counting state of said up/down counting means;

an adding means with a plurality of addend input means and a data output means for adding values scored in each of said up/down counting means;

connecting means between each of said count output means and said addend input means to allow addition of values scored in said separate up/down counting means;

a clock means producing a uniform pulse train;

an accumulating means which records and updates a nonnormalized value of the combined average server occupancy, expressed mathematically as $\Sigma x_k d_k$, where $x_k$ is the instantaneous total number of occupied servers in all subgroupings and $d_k$ is a measure of the duration of said occupancy state, including a data input means, a data output means, an accumulate enable input means for triggering accumulation of data present at said data input means, and a reset means which is manually activated after all said subgroups have been observed to experience congestion, said condition indicated when a server congestion pulse has been monitored from each of said server subgroups, where said accumulator activation starts said measurement interval;

connecting means between said data output means of said adding means and said data input means of said accumulating means;

a connecting means between output of said clock means and accumulate enable input means of said accumulating means allowing accumulation of values scored in said adding means at every clock pulse during said measurement interval so that each state scored in said adding means is added in said accumulating means a number of times proportional to duration of said state.

15. The device described in claim 14 further including a squaring decoding means, including data input and output means, for squaring count output of said adding means described in claim 17;

a second accumulating means including a data input means, a data output means and an accumulate enable input means for triggering accumulation of data present at said data input means;

connecting means between said data output means of said adding means and said data input means of said squaring decoding means;

connecting means between said data output means of said squaring decoding means and said data input means of said second accumulating means; and a connecting means between said clock means, described in claim 17, and said accumulate enable input means, to facilitate measurement of variance of carried traffic by accumulating squares of each state scored in said up/down counting means a number of times proportional to the duration of said state, where the value accumulated in said second accumulating means can be expressed mathematically as $$\sum_{k=1}^{N} x_k^2 n_k$$

where N is the number of up/down counter states over said measurement interval, $x_k^2$ is the square of the number of servers occupied during the $k_{th}$ counter state, square, $n_k$ is the number of clock pulses occuring during the $k_{th}$ state scored in said up/down counting means and P is the total number of clock pulses generated over said measurement interval, with k used as a standard subscripting variable.

16. The device described in claim 14 further including a counter timing means which is reset at the start of said measurement interval including a count input means which is connected to said clock means, for continuously counting the number of clock pulses during said measurement interval; and a dividing means which divisor input means connected to output of said counter timing means and dividend input means connected to said data output means of said accumulating means so as to produce the value in said accumulating means divided by the number of clock pulses occurring during said measurement interval, in order to normalize the value in said accumulating means by the length of said measurement interval, which can be expressed mathematically as $$\frac{1}{P} \sum_{k=1}^{N} x_k n_k$$

and may be referred to as the total carried traffic, where P is the total number of clock pulses during said measurement interval, N is the total number of up/down counter transition states over said measurement interval, $n_k$ is the number of clock pulses generated during the $k_{th}$ up/down counter state and $x_k$ is the number of servers occupied during the $k_{th}$ state.

17. The device described in claim 14 further including:
a comparator means including a first and a second data input means and a logic output means for providing a logic level to indicate whether said up/down counter count output is equal to number of servers in group being measured;
a timing counter means, including a count increment input means and count output means, which counts the number of clock pulses during the server noncongestion period over said measurement interval;
a control gating means, including first and second input means and output means for allowing pulses from clock means to be applied to said timing counter means during periods of server noncongestion when at least one server is unoccupied;
a dividing means including a divisor data input means, a dividend data input means and a quotient data output means for dividing said data output of said accumulator means by count output of said timing counter means;
a connecting means between said clock means and first input of said gating means;
a connecting means between said output means of said adding means and said first data input means of said comparator means;
a connecting means between said second data input means of said comparator means and data source equivalent to number of servers being measured;
connecting means between said logic output of said comparator means and said second input means of said control gating means providing a logic level indicating whether count stored in said up/down counter is equal to number of servers being measured;
a connecting means between output of said control gating means and said timing counter count increment input means;
connecting means between output means of said timing counting means and divisor data input means of said dividing means; and
connecting means between said data output means of said accumulator means and said dividend data input means of said dividing means, where the result obtained often referred to as the offered traffic can be expressed mathematically as $$\frac{1}{M \Delta t} \sum_{k=1}^{N} x_k n_k \Delta t$$

where N is the number of up/down counter transition states over the period of measurement, M is the number of clock pulses generated during noncongestion periods, $\Delta t$ is the clock pulse duration, $x_k$ is the number of servers occupied in the kth state, and $n_k$ is the number of clock pulses generated during the kth transition state.

18. In a traffic measuring system, a device enabling the continuous measurement of the combined server occupancy on a plurality of separately monitored server subgroupings, with only three measuring leads required from each server subgrouping, over a measurement interval, also termed the measurement period, defined as beginning after servers in each separate server subgroup which have been separately observed become simultaneously occupied and ending at the desired time of observation, utilizing from each of said server subgroupings server seize pulses, each of which indicates that a server has become occupied, server release pulses, each of which indicates that a server has become unoccupied and server congestion pulses, each of which indicates that all servers in a server subgrouping have become occupied, comprising:
a plurality of up/down counting means, each of which monitors the occupancy state of one of said server subgroupings and each of which includes a first input means driven by said seize pulses from said server subgrouping for incrementing count of said up/down counting means, a second input means driven by said release pulses from said server subgrouping for decrementing count of said up/down counting means, and a third input means driven by said server congestion pulses from said server subgrouping for enabling the count of said up/down counting means to be present at a predetermined value, and count output means for indicating counting state of said up/down counting means;
an adding means with a plurality of addend input means and a data output means for adding values scored in each of said up/down counting means; and
connecting means between each of said count output means and said addend input means to allow addition of values scored in said separate up/down counting means;
where the total instantaneus occupancy state of all server subgroupings is scored in said adding means and is determined without requiring the separate observation and scanning of each of said servers in said subgroupings.

* * * * *